United States Patent [19]

Oikawa et al.

[11] Patent Number: 4,928,349
[45] Date of Patent: May 29, 1990

[54] GROMMET STRUCTURE

[75] Inventors: Ryuetsu Oikawa; Akihiko Fujita, both of Shizuoka, Japan

[73] Assignee: Yazaki Corporation, Tokyo, Japan

[21] Appl. No.: 337,804

[22] Filed: Apr. 14, 1989

Related U.S. Application Data

[62] Division of Ser. No. 217,029, Jul. 11, 1988.

[30] Foreign Application Priority Data

Jul. 15, 1987 [JP] Japan .......................... 62-107512[U]

[51] Int. Cl.$^5$ .............................................. F16L 5/02
[52] U.S. Cl. .......................................... 16/2; 174/656; 174/152 G; 174/153 G; 248/56
[58] Field of Search ............ 16/2, DIG. 33, DIG. 27; 248/56; 174/65 G, 152 G, 153 G; 439/445, 446, 553, 559

[56] References Cited

U.S. PATENT DOCUMENTS

| | | | |
|---|---|---|---|
| 3,424,416 | 1/1969 | Dell et al. .................... | 16/2 |
| 3,518,359 | 6/1970 | Trimble et al. ............... | 16/2 |
| 3,749,818 | 7/1973 | Jemison ........................ | 16/2 |
| 4,074,945 | 2/1978 | Kraus et al. .................. | 16/2 |
| 4,797,513 | 1/1989 | Ono et al. .................... | 248/56 |

FOREIGN PATENT DOCUMENTS 57-15626 of 1982 Japan .
102099 7/1963 Norway .......................... 174/152 G Primary Examiner—Nicholas P. Godici
Assistant Examiner—Edward A. Brown
Attorney, Agent, or Firm—Sughrue, Mion, Zinn, Macpeak & Seas

[57] ABSTRACT

A grommet comprises a soft grommet body including a supporting portion arranged such that an electric wire insertion hole is formed in an inner peripheral portion of a hollow disc-like base, a peripheral wall is clookedly formed along an outer periphery thereof, and a tip portion thereof is further bent inwards. The grommet has a square pillar. The pillar having a substrate fitted in an annular recess defined by the substrate, the peripheral wall and the supporting portion. A plurality of angular portions are each fitted in a hole of a pannel. The grommet has a hard resinous lock member having stop members for providing a locking force in the hole. An inner periphery of the supporting portion assumes an angular configuration having a plurality of corners close to the plurality of angular portions.

7 Claims, 10 Drawing Sheets

GROMMET STRUCTURE

This is a division of application Ser. No. 07/217,029 filed July 11, 1988

BACKGROUND OF THE INVENTION

The present invention generally relates to a structure of a grommet consisting of a grommet body and a soft resinous lock member, and more particularly, to a grommet having a structure for preventing the grommet body fitted to the resinous lock member from being released therefrom.

FIG. 1 is a perspective view illustrating parts of a conventional grommet, FIG. 2 is a vertical sectional view illustrating the assembly thereof, and FIG. 3 a rear elevation. The conventional grommet shown is composed of a soft grommet body A and a hard resinous lock member B. The grommet body A has a protrusively provided tube 2 serving as an electric wire insertion hole formed in an inner periphery of a base 1 assuming a hollow disc-like configuration. A peripheral wall 3 is crookedly formed along an outer periphery of the base 1; and the tip portion of the peripheral wall 3 is further bent inwards, thus providing an annular supporting portion 4.

An inner peripheral surface of the tube 2 is provided with a plurality of lips 5 by which an electric wire inserted into the tube 2 is sealed. For waterproofing, tapes T are wound both on the electric wire 6 and on the tube 2.

The base 1, the peripheral wall 3 and the supporting portion 4 of the grommet body 4 cooperate to internally form an annular recess 7 to which a substrate 8 of the resinous lock member B is attached.

The resinous lock member B includes the hollow disc-like substrate 8 on which a square pillar 9 is mounted. A bottom wall 10 assuming a hollow disc-like shape is fitted to the square pillar 9.

Four pieces of stop members 11 each having a stop stepped-portion 11a are vertically provided on the outer periphery of the bottom wall 10 so as to be directed to the substrate 8.

The stop members 11 are fitted in, creating elastic flexure, when the resinous lock member B is inserted into a hole of a panel P, resulting in elastic engagement of the stop stepped-portions 11a. The resinous lock member B is thus seized by the panel P. Accordingly, the square pillar 9 is formed to have four angular portions 9a middled between the contiguous stop members 11 so as not to interfere with the flexural deformation of the stop members 11.

The supporting portion 4 of the grommet body A, as depicted in FIG. 1, serves to support, with a dimension $l_1$, an entire outer periphery of the substrate 8, thus keeping the engagement of the resinous lock member B with the grommet body A (see FIGS. 4 and 5). The reference numeral 12 designates an annular outer peripheral lip, provided along the peripheral wall 3, for protecting the hole of the panel P from the permeation of water by virtue of its close-contact with the panel P.

The thus constructed grommet is installed in the following manner.

The grommet body A is, as illustrated in FIG. 2, fitted in the resinous lock member B, and the electric wire (wire harness) 6 penetrates the bottom wall 10 and the substrate 8 and is inserted into the tube 2.

Next, the resinous lock member B is inserted into the hole $P_1$ formed in the pannel P while being guided by the square pillar 9. At this time, each of the stop member 11 impinges upon an edge of the hole $P_1$, thereby producing flexure. Just when the stop stepped-portion 11a is overlapped with the hole $P_1$, the stop steppedportion 11a is brought into press-contact with the edge of the hole $P_1$ by pint of elastic force of the stop member 11, whereby the resinous lock member B is seized by the panel P. The outer peripheral lip 12 of the grommet body A fitted in the resinous member B is tightly secured to the panel P, causing elastic deformation.

In this way, the grommet functions to provide the waterproofing between the electric wire 6 and the pannel P.

The resinous lock member B fitted in the annular recess 7 formed in the grommet body A is held in a fit-state by the supporting portion 4. For instance, however, where a tensile force acts on the electic wire, the grommet body A is stretched together with the electric wire 6, thereby causing elastic deformation of the grommet body A. Then, the periphery of the supporting portion 4 is lifted with the result that the seizing force of the substrate 8 is lost. Hence, there arises such a problem that the grommet body A comes off the substrate 8.

The present invention has been made to obviate such problems.

SUMMARY OF THE INVENTION

A grommet according to the preesnt invention comprises: a soft grommet body including a supporting portion arranged such that an electric wire insertion hole is formed in an inner peripheral portion of a hollow disc-like base, a peripheral wall is crookedly formed along an outer periphery thereof, and tip portion thereof is further bent inwards; a square pillar having a substrate fitted in an annular recess constituted by a combination of the substrate, the peripheral wall and the supporting portion, and a plurality of angular portions each fitted in a hole of a panel; and a hard resinous lock member having stop members for providing locking in the hole. In this construction, an inner periphery of the supporting portion assumes an angular configuration having corners close to the plurality of angular portions.

With this arrangement, a seizing width of the supporting portion for seizing the substrate of the resinous lock member is widened. Even if the tensile force works on the grommet body to such an extent that the grommet body is deformed, it is hard for the substrate to be released from the annular recess because of the larger seizing width of the supporting portion. This results in improvement of reliability of a water proofing function of the grommet.

DETAILED DESCRIPTION OF THE PREFERRED EMBODIMENTS

Embodiments of the present invention will hereinafter be described with reference to the accompanying drawings.

Note that the same components as those in the conventional example are marked with the like symbols.

Figure 5:
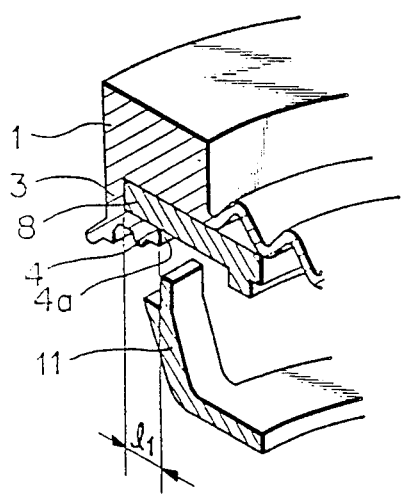
FIG. 5 is a sectional perspective view showing an angular portion of a square pillar of the grommet shown in FIG. 1.
Figure 6:
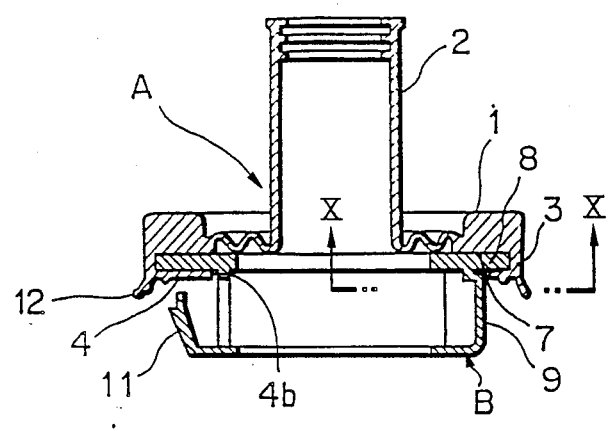
FIG. 6 is a sectional view taken along the line VI—VI of FIG. 7.
Figure 9:
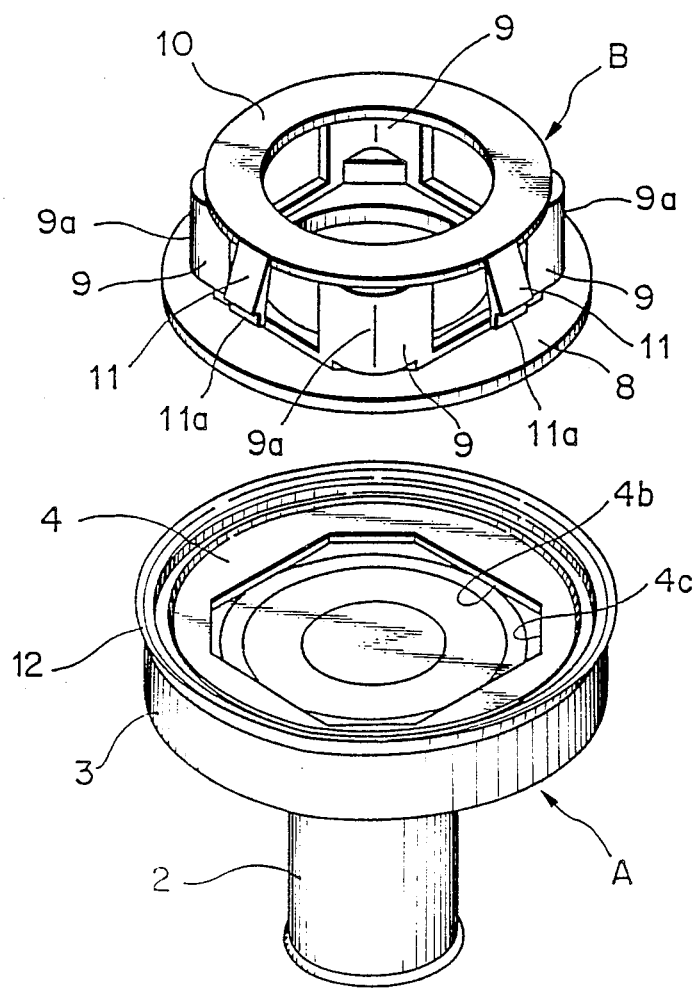
FIG. 9 is a perspective view showing a grommet body and a resinous lock member according to the invention.

FIG. 5 is a cross-sectional view of a grommet, FIG. 6 is a rear elevation thereof and FIG. 9 is a perspective view showing parts thereof. The grommet shown consists essentially of a soft grommet body A and a hard resinous lock member B. A substrate 8 is fitted in an annular recess 7, which arrangement is the same as that in the prior art. In addition, a configuration of the resinous lock member B is identical with that in the conventional example.

Figure 8:
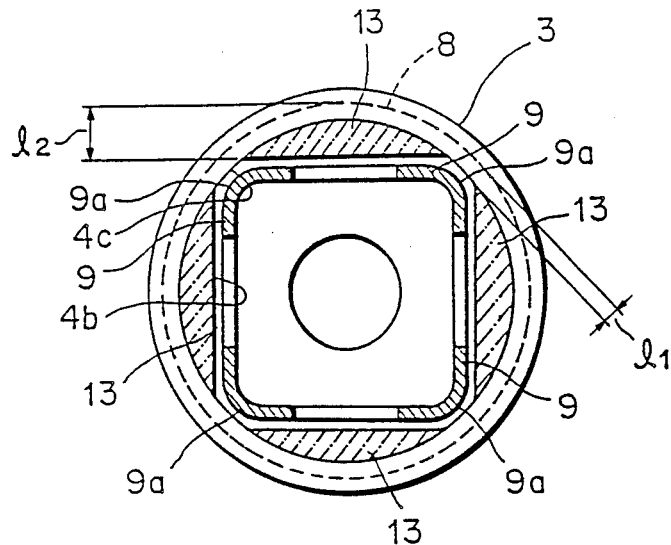
FIG. 8 is a sectional view showing a seizing area of the embodiment.
Figure 10:
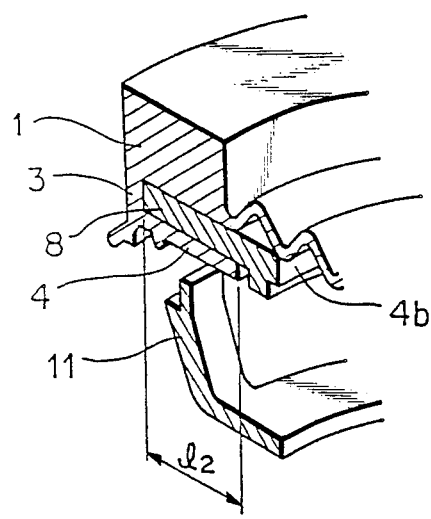
FIG. 10 is a sectional perspective view, taken along the line X—X of FIG. 10, showing a portion in the vicinity of a stop member of the grommet according to the invention.

An inner periphery of a supporting portion 4, as depicted in FIGS. 6 and 8, assumes a substantially square shape. Namely, this square is shaped by connecting an inner periphery 4b with a rectilinear line.

Figure 1:
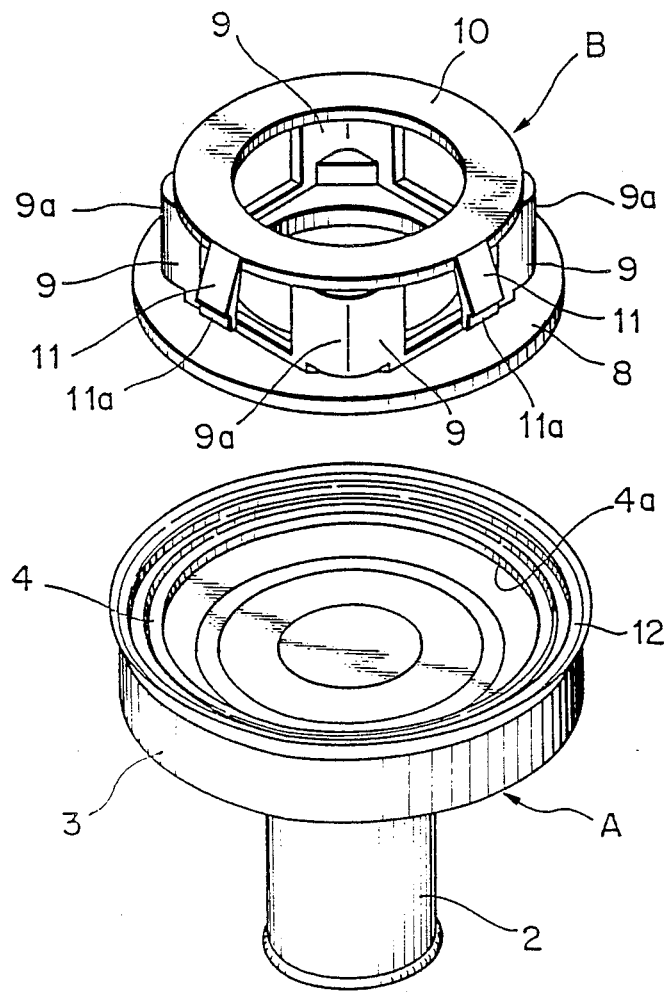
FIG. 1 is a perspective view showing a grommet body and a resinous lock member according to the prior art.
Figure 2:
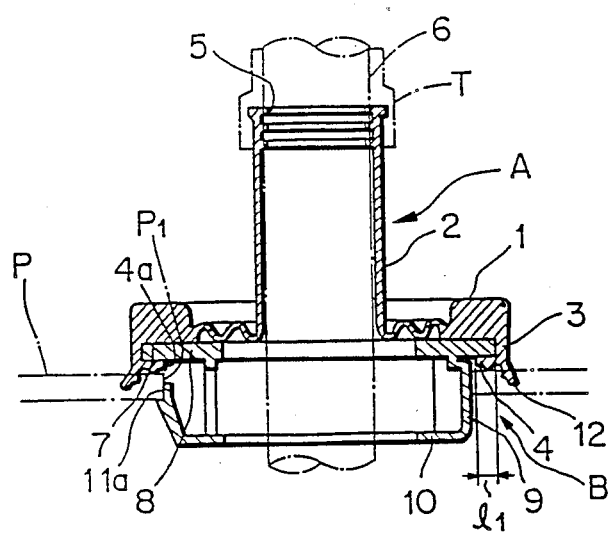
FIG. 2 is a sectional view taken along the line II—II of FIG. 3.
Figure 3:
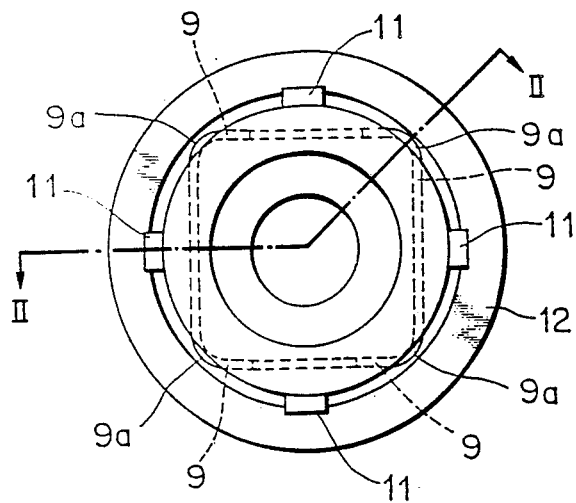
FIG. 3 is a rear view of the grommet according to the prior art.
Figure 4:
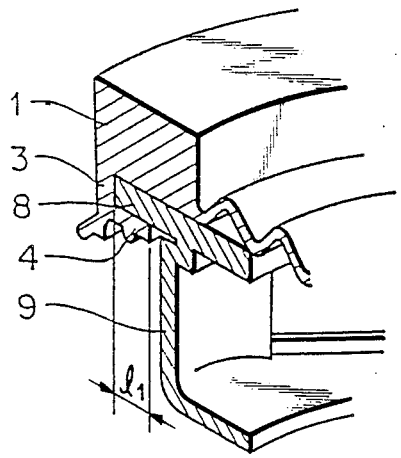
FIG. 4 is a sectional perspective view showing a portion in the vicinity of a stop member of the grommet shown in FIG. 1.
Figure 7:
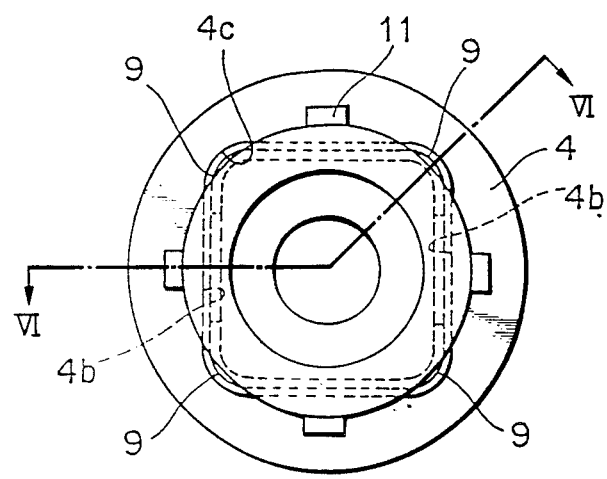
FIG. 7 is a rear view of a grommet according to the present invention.

In the prior art, the substrate 8 seizing width of the supporting portion 4 is uniformly $l_1$ (see FIGS. 4 and 5). In contrast with this, according to the present invention the seizing width is $l_1$ at a corner 4c but is $l_2$ in the intermediate portion between corners 4c (see FIG. 8). A seizing area increases by a range 13 defined by a dotted line of FIG. 7.

Therefore, the grommet body A is stretched together with an electric wire 6 undergoing outer tensile forces so that the grommet body A is subjected to distortion. Even under such a condition, it is difficult for the supporting portion 4 to come off the substrate 8.

Figure 11:
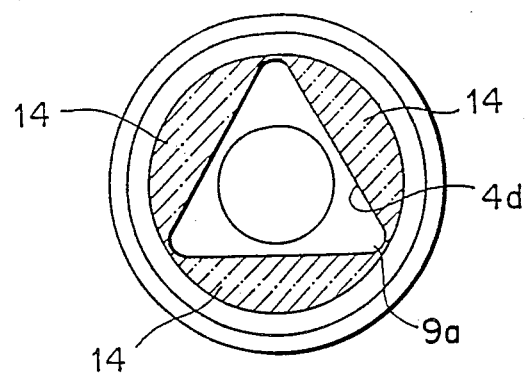
FIG. 11 is a sectional view showing another embodiment of the invention.

Directing attention to FIG. 11, there is shown another embodiment of the present invention, wherein a polygonal pillar 9 includes three angular portions 9a, and the inner periphery 4d of the supporting portion 4 takes a substantially triangular configuration.

In such a case, the substrate 8 seizing area of the supporting portion 4 increments by a range 14 defined by the dotted line as compared with that in the conventional example, whereby it is hard for the supporting portion 4 to be released from the substrate 8.

Where the square pillar 9 has five pieces of angular portions 9a, the configuration of the inner periphery of the supporting portion 4 may be substantially pentagonal.

However, if the configuration of the inner periphery of the supporting portion 4 is arranged to be more polygonal, the substrate 8 seizing area of the supporting portion 4 will be stepwise shrunk. Therefore, the seizing force undesirably exhibits less effects.

As discussed above, the present invention provides the following effects. Since the inner periphery of the supporting portion of the grommet body assumes the angular configuration having corners contiguous to the plurality of angular portions, the area for seizing the substrate thereof increases. By virtue of this arrangement, it is difficult for the grommet body to come off the resinous lock member, thereby improving the reliability of a waterproofing function of the grommet.

Figure 12:
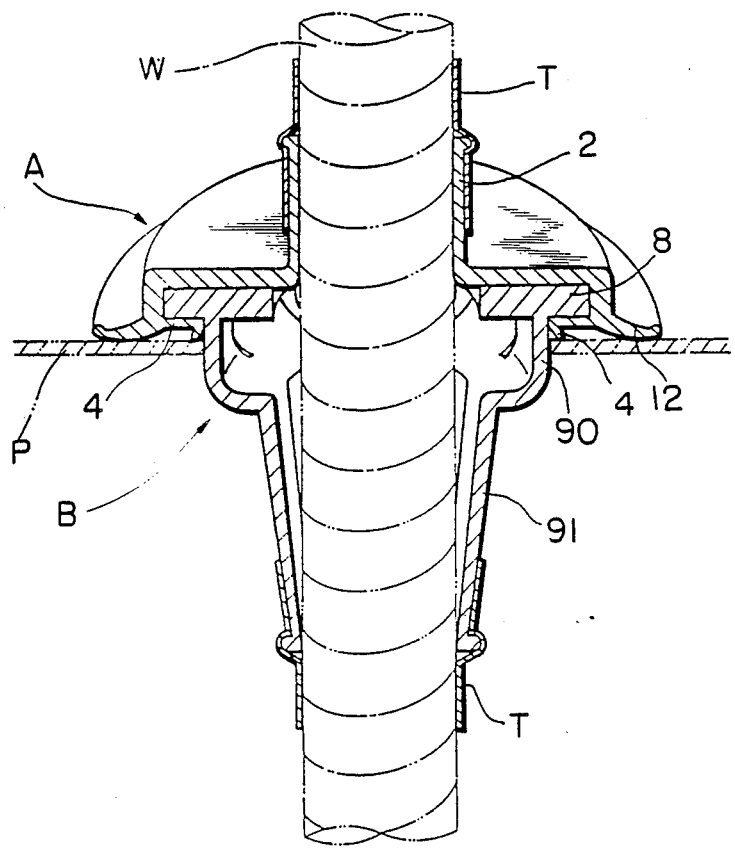
FIGS. 12 to 14 show another embodiment of the invention.
Figure 13:
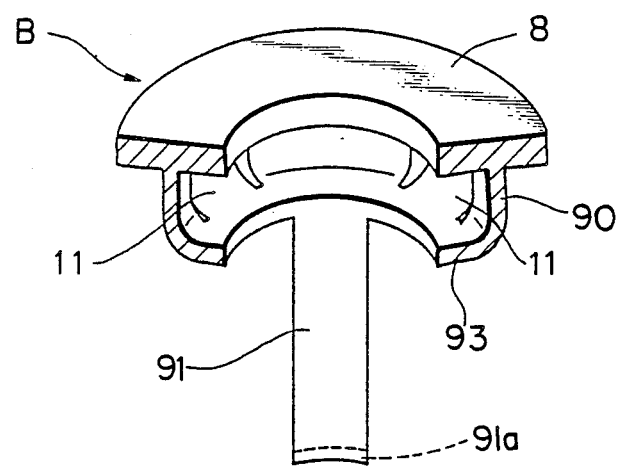
Figure 14:
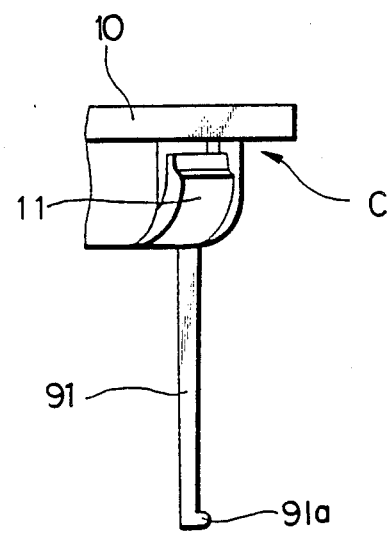

Another embodiment of the present invention will now be described with reference to FIGS. 12 to 14 in which the same reference numerals are used to designate the like components or members. In FIGS. 13 and 14, a hard resinous lock member B is provided with a base plate 8 and a circumferential wall 90 integrally formed with the base plate 8. An inward peripheral edge 93 is directed centrally. A plurality of cutout stop members 11 are formed in the circumferential wall 90. In this embodiment, instead of the specific form of the supporting portion 4, an electric wire fixing portion 91 is formed integrally with the peripheral edge portion 93 of the resinous lock member B. The plate-like fixing portion 91 extends downwardly with a diameter being gradually decreased toward a distal end at which a projection 91a is provided. In this embodiment, the grommet structure may be installed on the pannel P substantially in the same manner as in the foregoing embodiment. A tape T is applied to the tube 2 and the wire fixing portion 91 as shown in FIG. 12.

Figure 15:
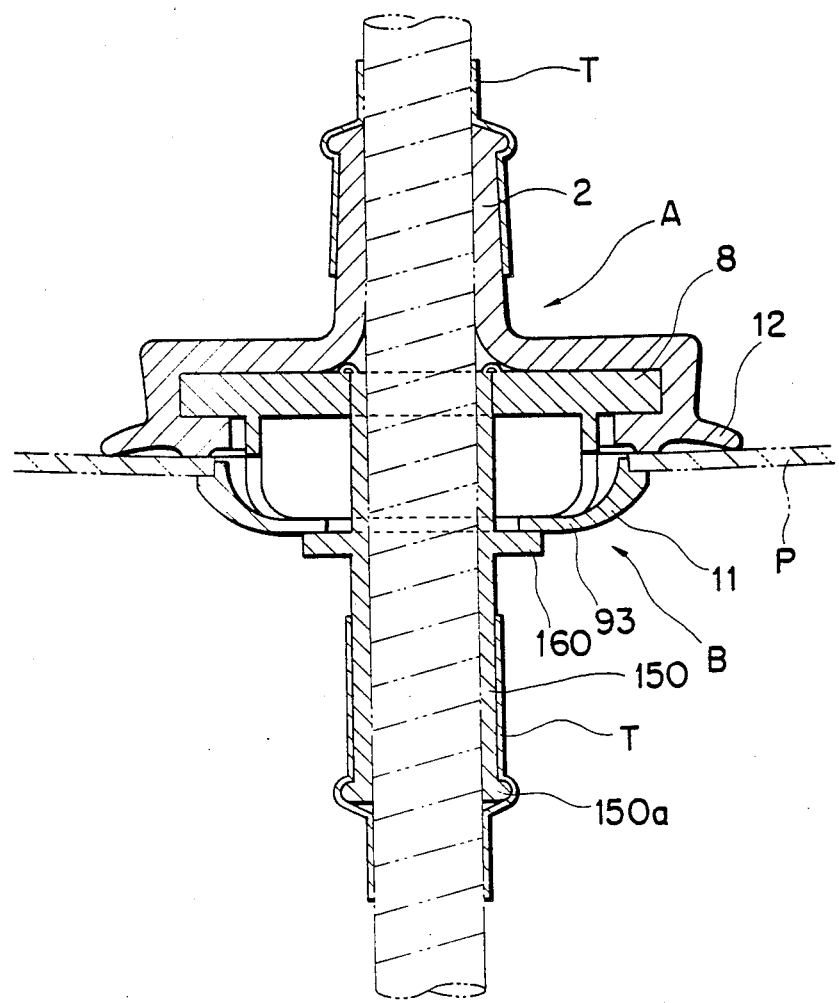
FIGS. 15 to 17 show still another embodiment of the invention.
Figure 16:
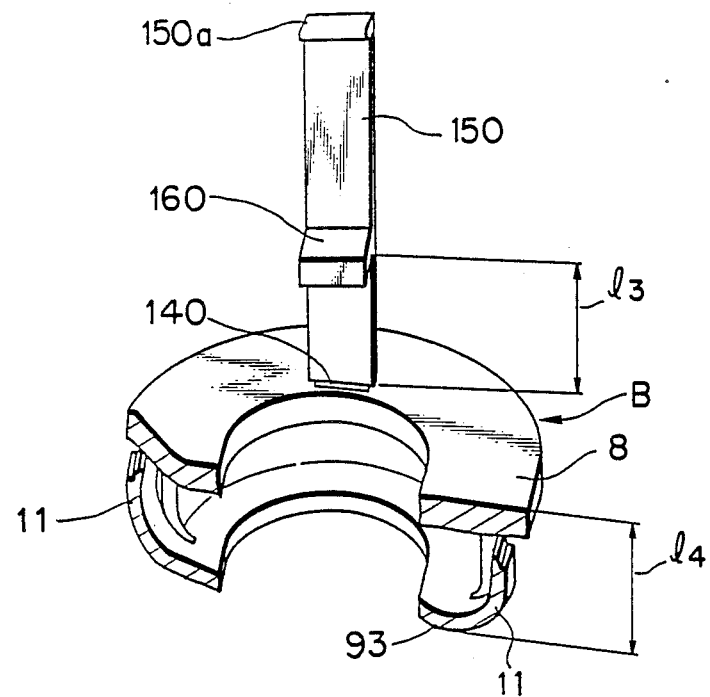
Figure 17:
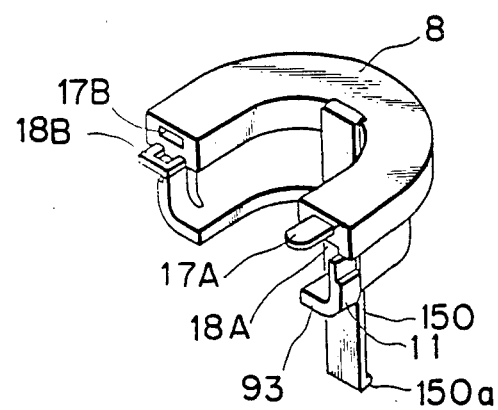

FIGS. 15 to 17 show another embodiment of the invention, in which the same reference numerals are used to indicate the like components or members. As shown in FIG. 16, an electric wire fixing portion 150 that is substantially in the form of a planar member is integrally formed through a hinge portion 140 with the substrate 8 of the lock member 8. It should be noted that the lock member 8 is divided into two halves to be assembled later. A stop 160 is formed on one side of the fixing portion 15 at a distance $l_3$ from the hinge portion 140. The distance $l_3$ is somewhat larger than a thickness $l_4$ of the resinous lock member C. Namely, the fixing portion 150 is turned through 180° with the projecting stop 160 being directed outwardly as shown in FIG. 17. In this case the stop 160 is positioned in contact with the peripheral edge 93 of the lock member B. The wire fixing portion has a projection 150a at its distal end around which the tape T is applied as in the foregoing embodiment.

It is apparent for those skilled in the art that the wire fixing means shown in FIGS. 12 to 14 and 15 to 17 may be applied to the square pillar structures shown in FIGS. 6 to 11.

We claim:

1. A grommet for insertion in a hole in a panel comprising:
    a soft grommet body, including a supporting portion, arranged such that an electric wire insertion hole is formed in an inner peripheral portion of a hollow disc-like base at one end of said soft grommet body, a peripheral wall crookedly formed along an outer periphery of said hollow disc-like base, and a tip portion of said peripheral wall being futher bent inwards to provide said supporting portion;

a hard resinous lock member comprising a base plate to be engaged with a recess defined by said hollow disc-like base, said peripheral wall, and said supporting portion, said base plate including a circumferential wall integrally formed with said base plate, an inward peripheral edge directed centrally, and stop members formed in said circumferential wall to be locked to said hole formed in said panel, wherein said resinous lock member is provided with a wire fixture portion extending downwardly and formed integrally with said peripheral edge portion, wherein the diameter of said wire fixture portion is gradually decreased to a distal end, said wire fixture portion further comprising a projection at said distal end.

2. A grommet for insertion in a hole in a panel comprising:

a soft grommet body, including a supporting portion, arranged such that an electric wire insertion hole is formed in an inner peripheral portion of a hollow disc-like base at one end of said soft grommet body, a peripheral wall crookedly formed along an outer periphery of said hollow disc-like base, and a tip portion of said peripheral wall being further bent inwards to provide said supporting portion;

a hard resinous lock member comprising a base plate to be engaged with a recess defined by said hollow disc-like base, said peripheral wall, and said supporting portion, wherein said resinous lock member is provided with a wire fixing portion integrally formed with said base plate through a hinge portion.

3. A grommet as claimed in claim 2, wherein said wire fixing portion is in the form of a planar member.

4. A grommet as claimed in claim 2, wherein said hard resinous lock member is divided into two halves.

5. A grommet as claimed in claim 2, wherein said fixing portion includes a stop portion formed on one side of said fixing portion and a projection located at a distal end of said fixing portion.

6. A grommet as claimed in claim 5, wherein said stop portion is located from said hinge portion at a distance greater than a thickness of said resinous lock member.

7. A grommet as claimed in claim 5, wherein said stop member is located adjacent to an end face of said disc-like base.

* * * * *